US008817334B2

(12) United States Patent
Kikuchi (10) Patent No.: US 8,817,334 B2
(45) Date of Patent: Aug. 26, 2014

(54) INFORMATION PROCESSING APPARATUS, METHOD, AND COMPUTER-READABLE MEDIUM

(75) Inventor: Hiroshi Kikuchi, Masashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 12/429,843

(22) Filed: Apr. 24, 2009

(65) Prior Publication Data

US 2009/0268259 A1 Oct. 29, 2009

(30) Foreign Application Priority Data

Apr. 25, 2008 (JP) .................................. 2008-115737

(51) Int. Cl.
*H04N 1/32* (2006.01)
*H04N 1/40* (2006.01)
(52) U.S. Cl.
USPC .......................................... 358/468; 358/448
(58) Field of Classification Search
CPC ................................................ H04N 1/00875
See application file for complete search history.

(56) References Cited

U.S. PATENT DOCUMENTS

| 2003/0179399 | A1* | 9/2003 | Matsunoshita | ............... 358/1.13 |
| 2005/0123316 | A1* | 6/2005 | Hirano | ............................ 399/80 |
| 2005/0141010 | A1* | 6/2005 | Kanai | ........................... 358/1.14 |
| 2006/0007471 | A1* | 1/2006 | Okamoto et al. | ............. 358/1.14 |
| 2007/0291318 | A1* | 12/2007 | Wang et al. | .................... 358/3.28 |
| 2009/0161993 | A1* | 6/2009 | Matsunoshita | ................ 382/305 |

FOREIGN PATENT DOCUMENTS

| CN | 1445711 A | 10/2003 |
| JP | 01-079758 A | 3/1989 |
| JP | 10-312447 A | 11/1998 |

* cited by examiner

*Primary Examiner* — Marivelisse Santiago Cordero
*Assistant Examiner* — Moustapha Diaby
(74) *Attorney, Agent, or Firm* — Canon U.S.A., Inc. IP Division (57) ABSTRACT

An information processing apparatus determines permission to duplicate a target image based on a two-dimensional code included in the target image. The information processing apparatus includes a CPU having a control unit that stores information concerning the target image, information based on the two-dimensional code including information indicating the permission of the duplication of the target image, and information indicating a user who has issued an instruction to duplicate the target image in a copy log in association with each other if the two-dimensional code is included in the target image.

3 Claims, 7 Drawing Sheets

FIG. 8

INFORMATION PROCESSING APPARATUS, METHOD, AND COMPUTER-READABLE MEDIUM

BACKGROUND OF THE INVENTION

1. Field of the Invention

The present invention relates to an information processing apparatus, a method, and a program that determine permission to duplicate a document based on a code added to the document.

2. Description of the Related Art

Japanese Patent Laid-Open No. 10-312447 discloses a Quick Response (QR) code (trademark). A QR code added on a part of a document is called a "partial code."

The QR codes are generally used as measures to prevent unauthorized duplication in sites requiring a higher level of security against the duplication of sensitive documents. In a well known method, a duplication non-permission flag (a flag indicating that duplication is not permitted) is included in the QR code added on each document. If a copier machine reads the duplication non-permission flag from the QR code added on a document, the copier machine determines the non-permission of duplication and refrains from duplicating the document. Adding the duplication non-permission flag on an important document may prevent the important document from being duplicated.

However, if the QR code including the duplication non-permission flag is not found on a document, the duplication of the document is permitted. Accordingly, a document including the duplication non-permission flag can be duplicated by hiding the part where the QR code is added with the hand of a user or pasting a slip of paper on the part where the QR code is added.

SUMMARY OF THE INVENTION

According to an exemplary embodiment of the present invention, an information processing apparatus determines permission to duplicate a target image based on a two-dimensional code included in the target image. The information processing apparatus includes a control unit configured to store information concerning the target image, information based on the two-dimensional code including information indicating the permission of the duplication of the target image, and information indicating a user who has issued an instruction to duplicate the target image in a storage unit in association with each other if the two-dimensional code is included in the target image. According to another exemplary embodiment of the present invention, an information processing apparatus determines permission to duplicate a target image based on a two-dimensional code included in the target image. The information processing apparatus includes a control unit configured to store information indicating the target image, information included in the two-dimensional code, and information indicating a user who has issued an instruction to duplicate the target image in a storage unit in association with each other if the two-dimensional code is included in the target image.

Further features of the present invention will become apparent from the following description of exemplary embodiments with reference to the attached drawings.

DESCRIPTION OF THE EMBODIMENTS

Embodiments of the present invention will herein be described with reference to the attached drawings.

Figure 1:
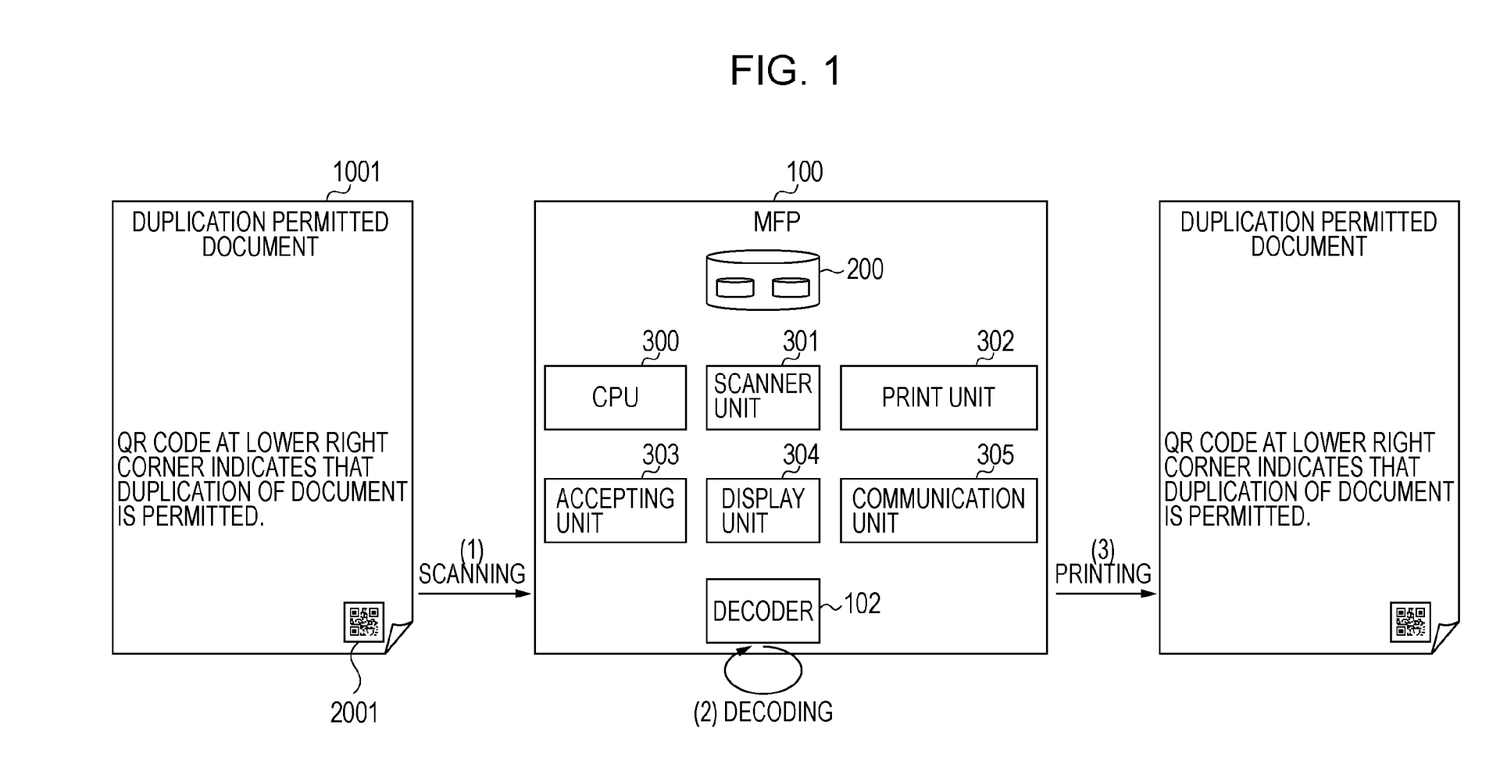
FIG. 1 illustrates an example of a system according to a first exemplary embodiment of the present invention.

FIG. 1 illustrates a system according to a first exemplary embodiment of the present invention. In the system illustrated in FIG. 1, a multifunction peripheral (MFP) 100 includes a central processing unit (CPU) 300, a decoder 102, a storage unit 200, a scanner unit 301, a print unit 302, an accepting unit 303, a display unit 304, and a communication unit 305. The communication unit 305 is used when the MFP 100 communicates with the administrator of the system via the Internet or a wired cable. The storage unit 200 stores a program shown in a flowchart in FIG. 2. The CPU executes programs in the storage unit 200 to control the processing by each component in the MFP 100.

Figure 5A:
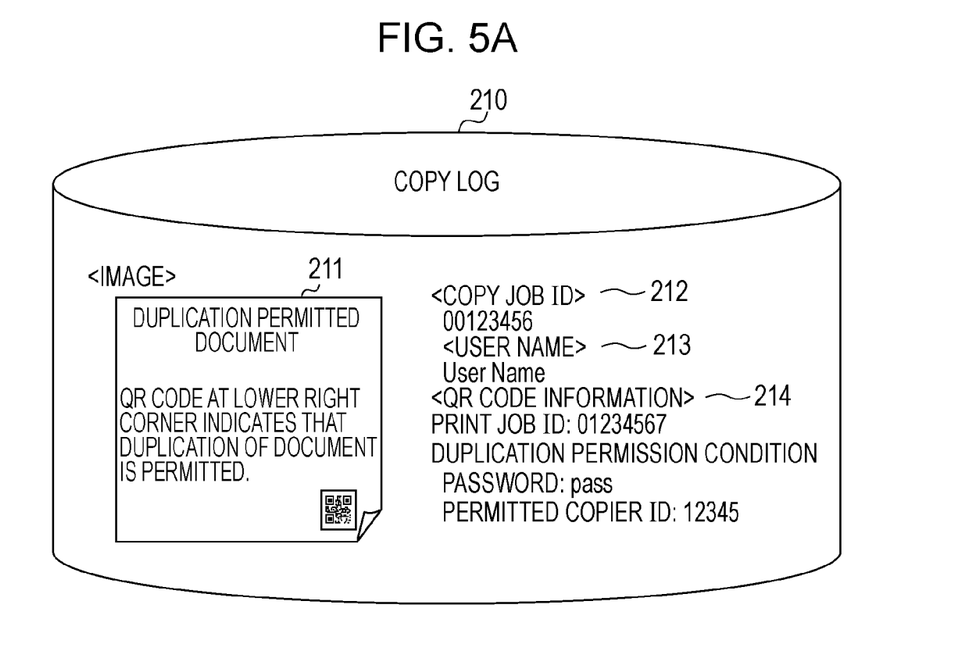
FIG. 5 illustrates a copy log and a print log stored in a storage medium.
Figure 5B:
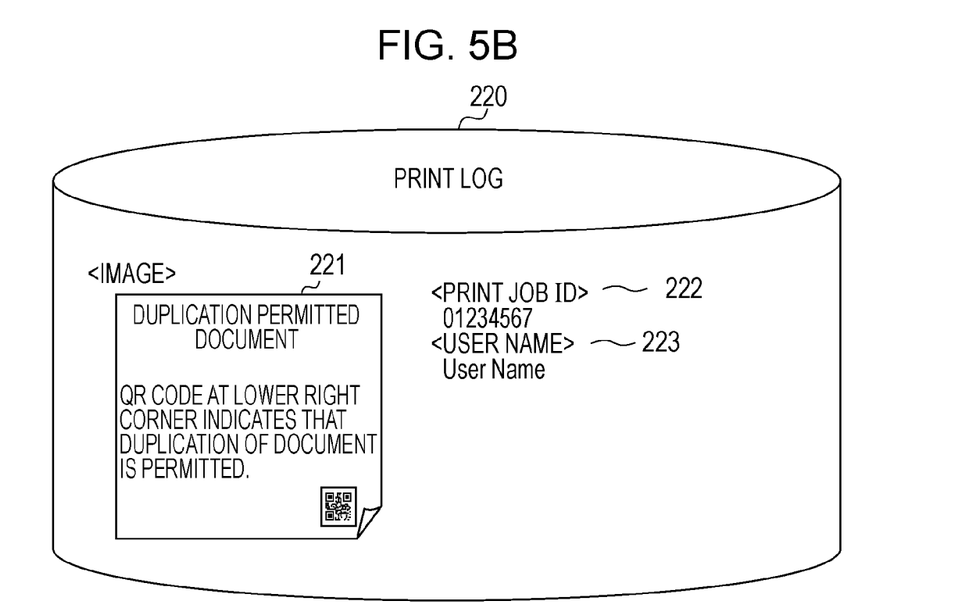

The storage unit 200 includes a storage area in which a copy log 210 shown in FIG. 5 is stored and a storage area in which a print log 220 shown in FIG. 5 is stored. Although the storage unit 200 is included in the MFP 100 in the present exemplary embodiment, the location of the storage unit 200 is not restricted to the MFP 100. The storage unit 200 may be provided in a server in the system, instead of the MFP 100.

An original document 1001 to be duplicated has a QR code 2001, which is a two-dimensional code. The QR code 2001 includes a duplication permission flag indicating that duplication of the original document is permitted as digital information.

An operation flow according to the first exemplary embodiment will now be described with reference to FIG. 2.

When the administrator selects "Duplication restriction without QR code" in selection of a security setting described below, the MFP 100 becomes capable of accepting the selection of a Copy start button by a user.

Figure 2:
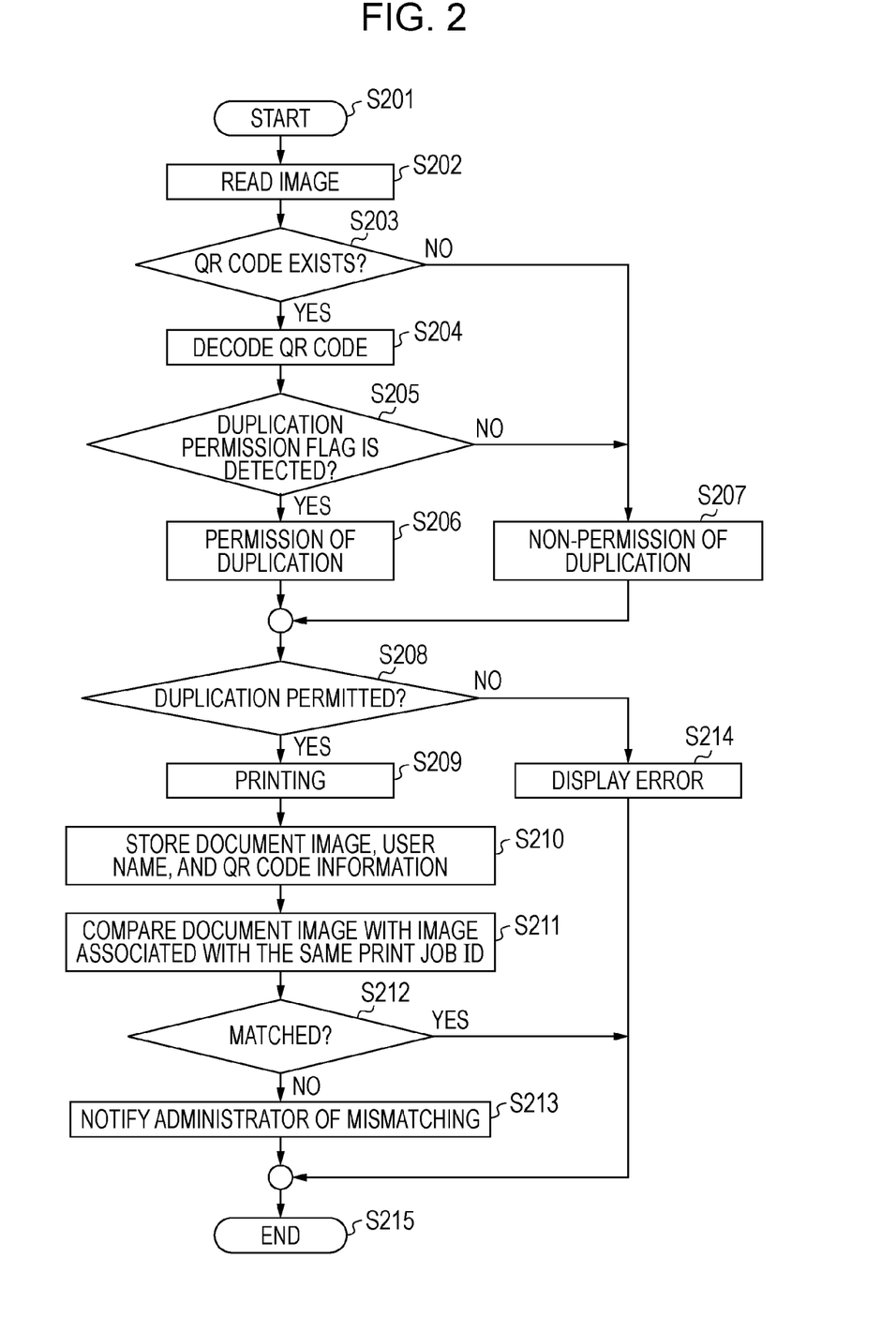
FIG. 2 is a flowchart showing an example of an operation according to the first exemplary embodiment.

FIG. 2 is a flowchart showing an example of a process when the accepting unit 303 accepts the selection of the Copy start button by the user. The user who has issued a duplication instruction has been authenticated before the Copy start button is selected. The steps in the flowchart in FIG. 2 are realized by the CPU 300 in the MFP 100, which executes the programs in the storage unit 200 to control each component in the MFP 100.

Referring to FIG. 2, when the accepting unit 303 accepts the selection of the Copy start button, in Step S201, the process is started. In Step S202, the CPU 300 causes the scanner unit 301 to scan the document 1001 on the document table to read an image of the document 1001 as a document image.

In Step S203, the CPU 300 determines whether the QR code 2001 exists in the document image.

If the CPU 300 determines that the QR code 2001 does not exist in the document image, then in Step S207, the CPU 300 determines non-permission of duplication of the document image.

If the CPU 300 determines that the QR code 2001 exists in the document image, then in Step S204, the CPU 300 causes the decoder 102 to decode the QR code 2001. In Step S205, the CPU 300 detects whether the duplication permission flag is included in the decoded QR code 2001 as the digital information. If the CPU 300 has detected the duplication permission flag, then in Step S206, the CPU 300 determines permission of duplication of the document image. If the CPU 300 has not detected the duplication permission flag, then in Step S207, the CPU 300 determines the non-permission of duplication of the document image.

The decoding according to the present exemplary embodiment will now be described. The codes including the partial code described above and an overall code described below are visually represented as patterns and both of the partial code and the overall code are generated by coding digital information. The decoding in the present exemplary embodiment means that the original digital information is acquired from the code visually represented as a pattern. The digital information may be text data, such as a character string, or may be binary data represented by any bit string. The decoder 102 has a function of decoding both of the partial code and the overall code.

Such a code can be called a barcode, a two-dimensional barcode, a digital watermark, a watermark message, an information copy-forgery-inhibited pattern, or an information pattern.

In Step S208, the CPU 300 confirms whether the permission of duplication or the non-permission of duplication is determined.

If the CPU 300 confirms that the permission of duplication is determined, then in Step S209, the CPU 300 causes the print unit 302 to print the document image. If the CPU 300 confirms that the non-permission of duplication is determined, then in Step S214, the CPU 300 causes the display unit 304 to display an error. Then in Step S215, the process in FIG. 2 is terminated without performing the steps from Step S209 to Step S213.

The control of each component in the MFP 100 by the CPU 300 enables only the document on which the duplication permission flag is added as the QR code 2001 to be duplicated. This has the advantage of preventing the document for which the duplication is not permitted from being duplicated.

After the CPU 300 causes the print unit 302 to print the document image in Step S209, in Step S210, the CPU 300 stores the duplicated document image, a copy job identifier (ID) (described below), information indicating the user who has issued the duplication instruction, and the digital information added on the QR code 2001 in the storage unit 200 in association with each other as the copy log 210. The information indicating the user may include the user name or the user ID. According to the present exemplary embodiment, the user name, which is the login name used when the user logs into the MFP 100, is used as the information indicating the user.

A specific example of the copy log 210 will now be described with reference to FIG. 5. Referring to FIG. 5, the copy log 210 includes an image 211, a copy job ID 212, a user name 213, QR code information 214 for every duplication instruction.

The image 211 indicates the document image for which the duplication is performed. When the image 211 is converted into digital information, the image 211 may be stored in a reduced thumbnail format because the digital information has a greater volume. The copy job ID 212 indicates ID information that is set in response to the duplication instruction. The QR code information 214 indicates digital information resulting from the decoding of the QR code 2001 on the document 1001 by the decoder 102. The decoded digital information includes a print job ID described below. If a duplication permission condition on which the permission of duplication is based is set for the QR code 2001, the duplication permission condition, a password satisfying the duplication permission condition, a permitted copier ID, etc. are included in the decoded QR code information 214.

Storing the decoded QR code information 214 as the digital information eliminates the need for decoding the QR code 2001 every time retrieval is performed, thereby improving the retrieval performance. In particular, since the decoding of the reduced thumbnail has a higher probability of failure, the digital information resulting from the decoding of the QR code 2001 may be stored before the reduction into the thumbnail.

The QR code information 214 including the duplication permission flag and the user name 213 who has issued the duplication instruction are stored in association with the image 211 that is duplicated in Step S210. Reference to the copy log 210 allows who duplicates what document image to be determined. Accordingly, it is possible to prevent unauthorized duplication in which the user cuts out the QR code 2001 from the document 1001 and pastes the cutout QR code 2001 on another document to allow duplication. Since the reference to the copy log 210 also aims to prevent the unauthorized duplication by the user, access control may be performed in which the reference to the copy log 210 by persons other than the administrator of the system is prohibited.

Step S211 in FIG. 2 will be described in detail.

First, an example of the print log 220 used in Step S211 will now be described with reference to FIG. 5. The print log 220 includes digital information concerning printing performed by the print unit 302 in response to a print instruction received from the printer driver by the MFP 100.

Referring to FIG. 5, the print log 220 includes an image 221, a print job ID 222, and a user name 223. The CPU 300 stores the image 221, the print job ID 222, and the user name 223 in the storage unit 200 in association with each other. The image 221 indicates the document image of the document 1001 for which the printing is performed. The print job ID 222 indicates ID information that is included in the print log 220 and that is uniquely set in response to the print instruction. When the document 1001 is printed by the print unit 302 in response to the print instruction from the printer driver, the CPU 300 causes the print unit 302 to include the print job ID 222 in the digital information included the QR code 2001 added on the document 1001.

Only the minimal items important for the present exemplary embodiment are indicated in the description of the copy log 210 and the print log 220 in FIG. 5. The log information may further include other information about the image to be duplicated, such as the job start time, the name of the MFP, the location where the MFP is installed, the name of a client computer, the IP address, and the document name.

The processing in Step S211 will now be described. The CPU 300 confirms whether the print job ID used when the document 1001 is printed is included in the QR code information 214 in the document image. If the CPU 300 confirms that the print job ID is included in the QR code information 214 in the document image, the CPU 300 refers to the print log 220 because the document 1001 may be printed by the MFP 100. If the reference to the print log 220 shows that the print log 220 having the print job ID 222 that is the same as the print job ID confirmed in the document image exists, the CPU 300 compares the document image with the image 221 associated with the print job ID 222. Any existing matching technology can be used in the comparison of the images.

In Step S212, the CPU 300 determines whether the document image is matched with the image 221 associated with the print job ID 222. If the CPU 300 determines that the document image is not matched with the image 221 associated with the print job ID 222, then in Step S213, the CPU 300 causes the communication unit 305 to notify the administrator registered in advance of the mismatching of the images as a warning used for preventing the unauthorized duplication. In Step S215, the process in FIG. 2 is terminated. If the CPU 300 determines in Step S212 that the document image is matched with the image 221 associated with the print job ID 222, the CPU 300 causes the communication unit 305 not to send the notification to the administrator. In Step S215, the process in FIG. 2 is terminated.

Although the CPU 300 causes the communication unit 305 to notify the administrator of the mismatching of the images if the CPU 300 determines in Step S212 that the document image is not matched with the image 221 associated with the print job ID 222 in the present exemplary embodiment, the notification is not restricted to the above example and may be any warning for preventing the unauthorized duplication. For example, the CPU 300 may cause the display unit 304 to display a warning to the user. Alternatively, at the decoding of the QR code 2001, the image 221 in the print log 220 may be compared with the document image and, if the image 221 in the print log 220 is not matched with the document image, the CPU 300 may cause the printing not to be performed.

The use of the print job ID 222 allows the MFP 100 to confirm whether the QR code 2001 detected from the document 1001 is kept in the state where the QR code 2001 is added to the document 1001 or whether the QR code 2001 detected from the document 1001 is cut out from another document and is pasted on the document 1001. If the QR code 2001 can be pasted and the unauthorized duplication can be performed, the administrator is notified of the fact. Accordingly, it is possible to suppress the unauthorized duplication in which the user cuts out the QR code 2001 from the document 1001 and pastes the cutout QR code 2001 on another document to allow the duplication.

The example in which the QR code including the duplication permission flag is added on the document and the duplication of the document on which the QR code is not added is not permitted is described in the first exemplary embodiment. According to a second exemplary embodiment, an overall code is added on a document, in addition to the QR code, which is the partial code, to improve the security.

A code added over a document is called the "overall code."

Specific examples of the overall code will now be described. For example, Japanese Patent Laid-Open No. 2003-280469 discloses a Glyph code (trademark). The Glyph code includes "/" and "￥." The "/" indicates information "1" and the "￥" indicates information "0." Specifically, a dot having a shape of "/" or "￥" is put on a document to add digital information that can be decoded by a decoder supporting the Glyph code.

A code representing information by putting dots while being shifting from grid points, disclosed in, for example, Japanese Patent No. 3919808 is also included in the overall code. In general, such an overall code is light and has a lower legibility in order to keep the visibility of the content of a document (the image excluding the overall code). Such a code that is light and that has a lower legibility is called a low visibility barcode (LVBC).

Technologies for adding such a code by a printer driver in printing from an application executed on a personal computer (PC) are proposed. The overall code is added over the entire content of a document whereas the partial code is generally added after a part where the partial code is to be pasted is painted white.

The overall code has an advantage in that it is relatively difficult to be tampered with by pasting after printing. The overall code has the drawback of a higher probability of failure of decoding depending on the content. For example, the decoding fails when the overall code is added on the content that is painted black. Since it is necessary to paste the code including the same digital information over a document, the overall code has the drawback of a lower amount of digital information that can be processed, compared with the partial code.

The partial code has the advantage of keeping a constant quality regardless of the content because the partial code is added after the part where the partial code is to be pasted is painted white. The partial code has the drawback of being easily tampered by pasting after the printing.

The QR code is used as the partial code in the second exemplary embodiment. The LVBC is used as the overall code in the second exemplary embodiment.

Figure 3:
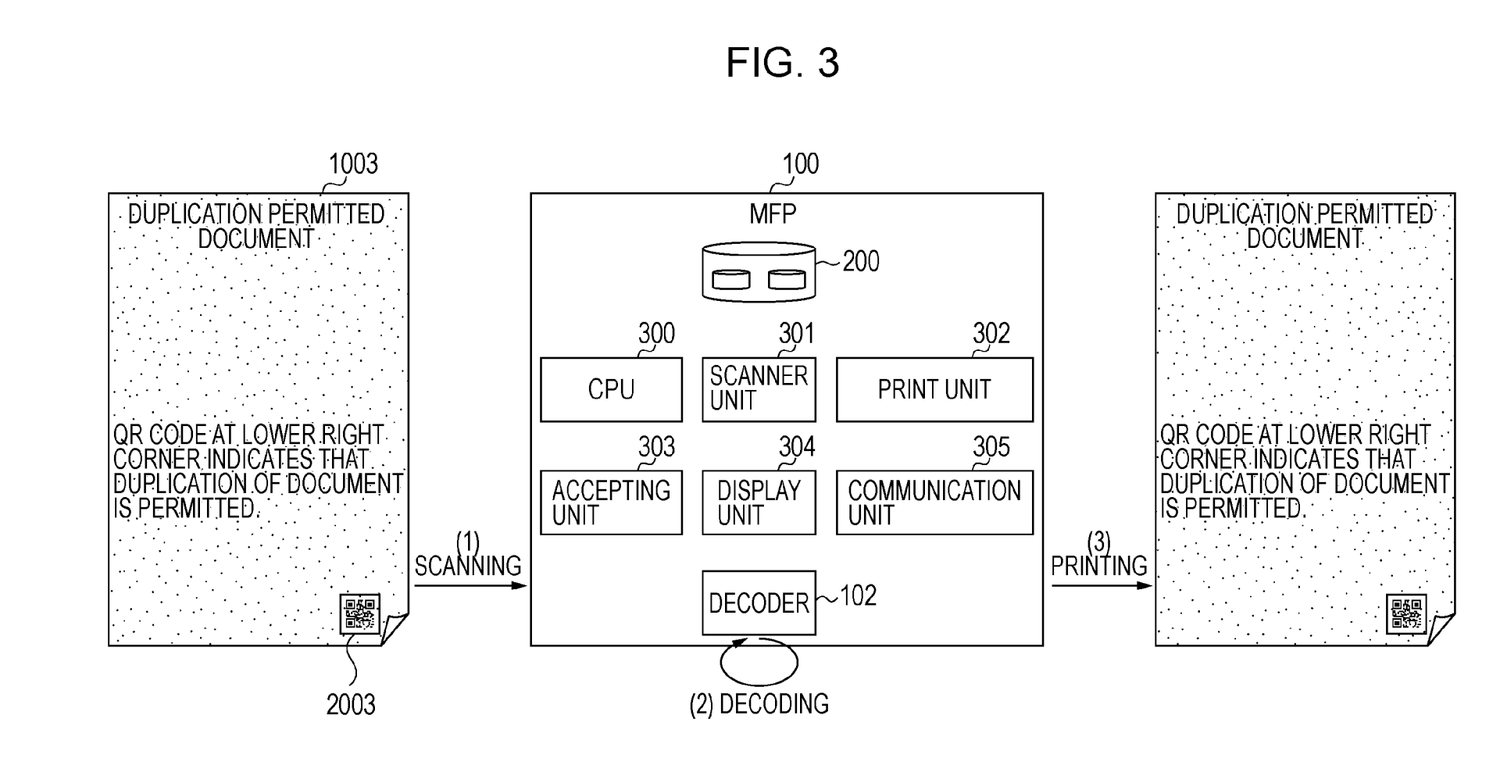
FIG. 3 illustrates an example of a system according to a second exemplary embodiment of the present invention.

FIG. 3 illustrates an example of a system according to the second exemplary embodiment of the present invention. Since the second exemplary embodiment is an extension of the first exemplary embodiment, only the differences from the first exemplary embodiment will be described below.

Figure 6:
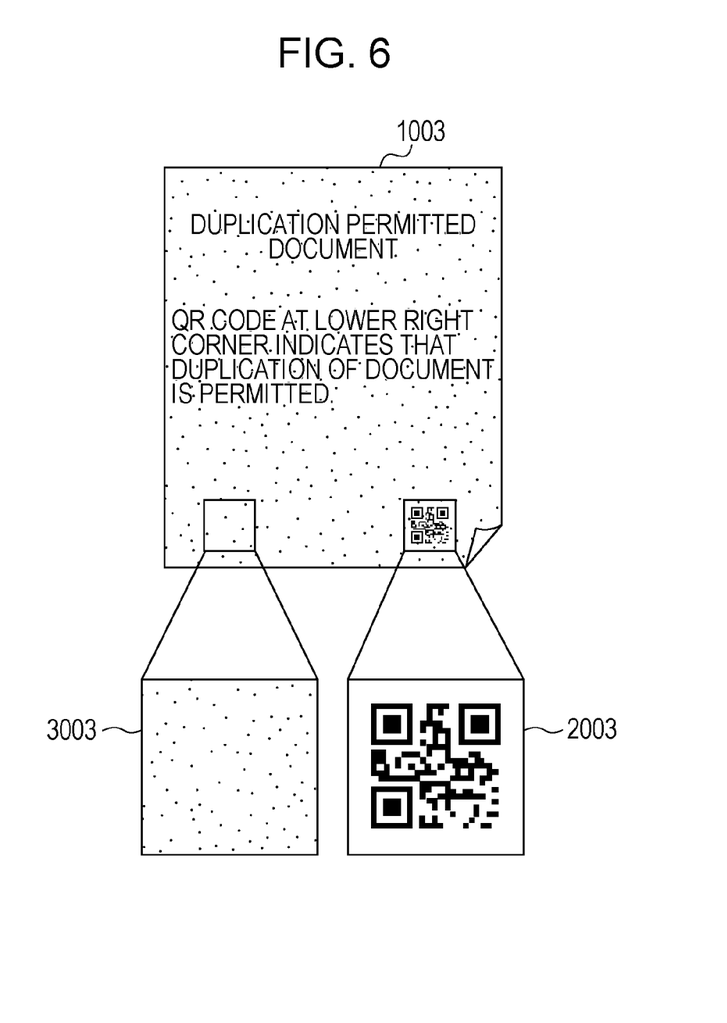
FIG. 6 illustrates a partial code and an overall code on a paper medium.

An original document 1003 to be duplicated in the second exemplary embodiment is shown in detail in FIG. 6. Referring to FIG. 6, a QR code 2003 added on the document 1003 includes digital information concerning the duplication permission condition, in addition to the duplication permission flag included in the QR code 2001 in the first exemplary embodiment.

Furthermore, an LVBC 3003 is added over the document 1003, in addition to the QR code 2003 like the QR code 2001 added on the document 1001. The LVBC 3003 is a two-dimensional code of a type different from that of the QR code 2003. The QR code 2003 is the partial code while the LVBC 3003 is the overall code. The LVBC 3003 includes a hash value of the QR code 2003 as digital information. The hash value of the QR code 2003 means a value resulting from calculation of a hash function using the digital information included in the QR code 2003, the digital information (not including an error correcting code) acquired after the QR code 2003 is decoded. Since it is sufficient for the LVBC 3003 to include the hash value of the QR code 2003 as the digital information, the amount of the digital information added to the LVBC 3003 is smaller than that added to the QR code 2003. It assumed here that the LVBC 3003 is not printed on the QR code 2003 on a document on which both of the QR code 2003 and the LVBC 3003 are added.

Figure 4:
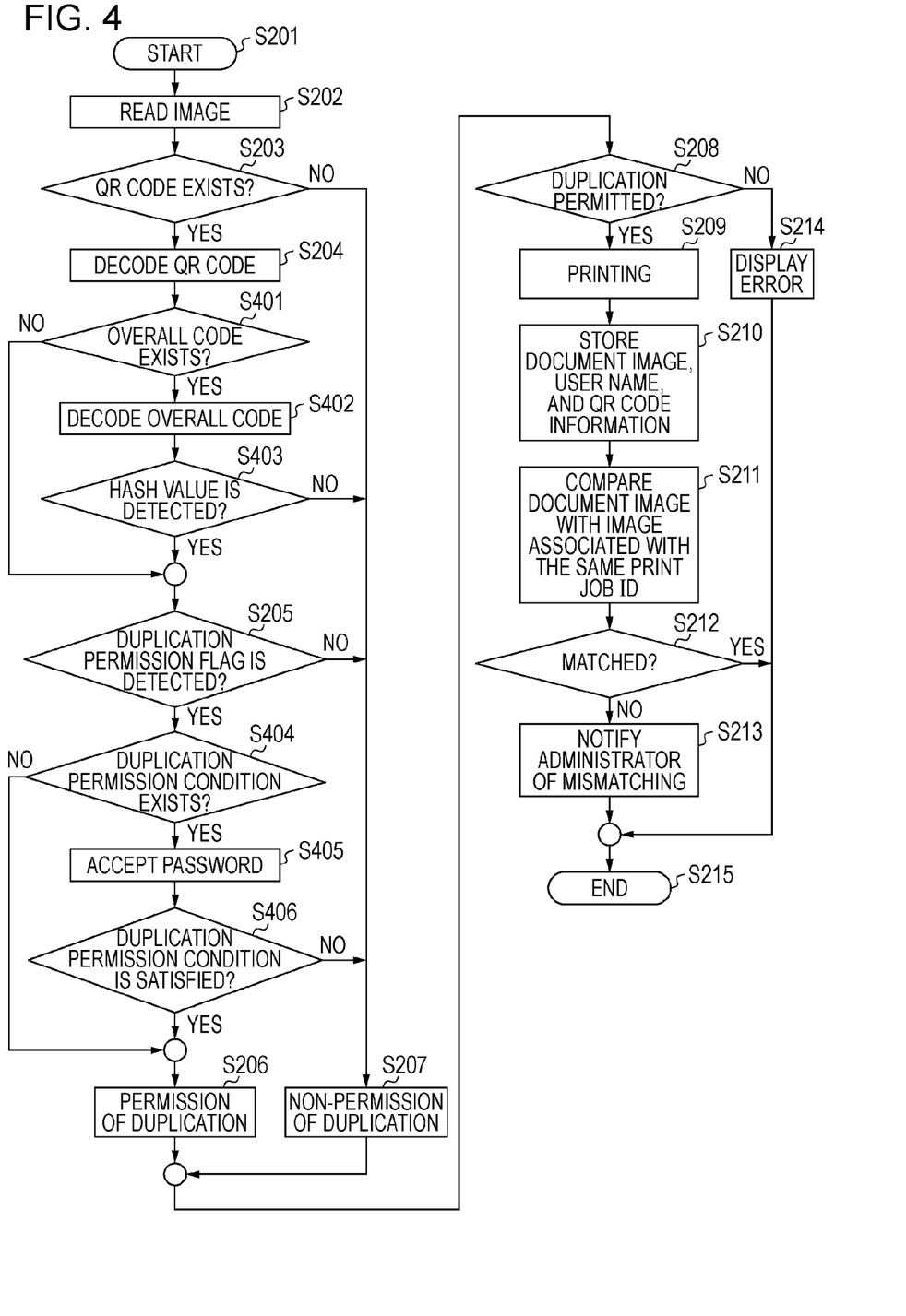
FIG. 4 is a flowchart showing an example of an operation according to the second exemplary embodiment.

An operation according to the second exemplary embodiment will now be described. A program shown in a flowchart in FIG. 4 is stored in the storage unit 200. The steps in the flowchart in FIG. 4 are realized by the CPU 300 in the MFP 100, which executes the programs in the storage unit 200 to control each component of the MFP 100.

If the CPU 300 determines in Step S203 that the QR code 2003 exists and the CPU 300 causes the decoder 102 to decode the QR code 2001 in Step S204, then in Step S401, the CPU 300 determines whether the LVBC 3003 exists on the document image. If the CPU 300 determines that the LVBC 3003 does not exist on the document image, the process proceeds to Step S205. If the CPU 300 determines that the LVBC 3003 exists on the document image, then in Step S402, the CPU 300 causes the decoder 102 to decode the LVBC 3003. In Step S403, the CPU 300 detects whether the hash value of the QR code 2003 is properly included in the digital information on the LVBC 3003. If the CPU 300 detects that the hash value of the QR code 2003 is properly included in the digital information on the LVBC 3003, the process proceeds to Step S205. If the CPU 300 detects that the hash value of the QR code 2003 is not properly included in the digital information on the LVBC 3003, the process proceeds to Step S207. In Step S207, the CPU 300 determines the non-permission of duplication.

The use of both the LVBC 3003, which is the overall code, and the QR code 2003, which is the partial code, in the above manner allows the duplication not to be permitted if the QR code 2003 including the duplication permission flag is cut out and is pasted on another document because the pasted QR code 2003 is not matched with the LVBC 3003. Accordingly, tampering by cutting and pasting the partial code is avoided.

When detailed security functions are added to the QR code 2003, a variety of digital information, such as password authentication, the settings of each user, and restrictions, is added to the QR code 2003 to possibly increase the size of the QR code 2003. The addition of only the digital information about the hash value of the partial code on the LVBC 3003 allows an increase in the amount of digital information on the LVBC 3003 to be suppressed even if the QR code 2003 is increased in size. Accordingly, the smaller amount of digital information that may be processed from the overall code is not issued because of the QR code 2003.

Although the hash value of one QR code 2003 is embedded in the LVBC 3003 in the second exemplary embodiment, the hash values of multiple QR codes 2003 may be embedded in the LVBC 3003. The multiple hash values embedded in the LVBC 3003 are compared with the hash values of the QR codes 2003. In order to associate the hash values with the multiple QR codes 2003, digital information, such as the coordinate value or ID of the LVBC 3003, indicating the association should be embedded in the LVBC 3003. The CPU 300 detects in Step S403 whether the hash values of the QR codes are properly included in the digital information on the LVBC 3003.

When the multiple QR codes 2003 are used, it takes a longer time to perform the steps from Step S401 to Step S403 because it is necessary to decode the multiple QR codes 2003. Accordingly, the security setting indicating whether the above steps are performed can be switched in the MFP 100.

The result of the detection in Step S403 may be stored in the copy log 210 as the digital information. The result of the detection of the hash value can be referred to from the copy log 210 after printing. This is effective when the steps from Step S401 to Step S403 are asynchronously performed because of a reduction in the processing time.

Referring to FIG. 4, in Step S404, the CPU 300 detects whether the duplication permission condition exists in the QR code 2003. If the CPU 300 detects no duplication permission condition, then in Step S206, the CPU 300 determines the permission of duplication. If the CPU 300 detects the duplication permission condition, then in Step S405, the CPU 300 enables the accepting unit 303 to accept input of a password from the user. In Step S406, the CPU 300 determines whether the password accepted by the accepting unit 303 satisfies the duplication permission condition. If the CPU 300 determines that the password accepted by the accepting unit 303 satisfies the duplication permission condition, then in Step S206, the CPU 300 determines the permission of duplication. If the CPU 300 determines that the password accepted by the accepting unit 303 does not satisfy the duplication permission condition, then in Step S207, the CPU 300 determines the non-permission of duplication.

The addition of the steps from Step S404 to Step S406 to the steps in the first exemplary embodiment provides the security function in which only a specific user satisfying the duplication permission condition can duplicate a document even if the QR code 2003 includes the duplication permission flag.

Although the password is used as the duplication permission condition in the second exemplary embodiment, the duplication permission condition is not restricted to the password. For example, identification information, such as the user name, may be used as the duplication permission condition.

In this case, any three information items: permission, non-permission, and conditional permission is embedded in the two-dimensional code. If the conditional permission is embedded in the two-dimensional code, a condition used for permitting the duplication, such as a password, a user name, or a department ID, should also be embedded in the two-dimensional code.

Although the case in which one document 1003 is duplicated is described in the second exemplary embodiment, the determination of whether the QR code 2003 exists may not be required for all the documents that are to be duplicated.

For example, for the first document among the multiple documents, the CPU 300 performs the steps from Step S203 to Step S403 in the flowchart in FIG. 4 to detect whether the hash value of the QR code 2003 is included in the LVBC 3003.

For the second and the subsequent documents, the CPU 300 determines whether the LVBC 3003 exists on the document image. If the CPU 300 determines that the LVBC 3003 does not exist on the document image, the CPU 300 determines the non-permission of duplication. If the CPU 300 determines that the LVBC 3003 exists on the document image, the CPU 300 causes the decoder 102 to decode the LVBC 3003. The CPU 300 detects whether the hash value of the QR code 2003 is correctly included in the digital information on the LVBC 3003. If the CPU 300 detects that the hash value of the QR code 2003 is correctly included in the digital information on the LVBC 3003, the CPU 300 determines the permission of duplication. If the CPU 300 detects that the hash value of the QR code 2003 is not correctly included in the digital information on the LVBC 3003, the CPU 300 determines the non-permission of duplication.

The determination of the permission of duplication or the non-permission of duplication for the second and the subsequent documents by the CPU 300 eliminates the need to decode the QR codes 2003 on all the multiple documents, thereby improving the efficiency of the processing.

It is sufficient to add the QR code 2003 only on one document when the multiple documents for which the duplication is permitted are to be printed, thereby preventing unnecessary printing.

Exemplary setting user interfaces of the MFP 100 will now be described with reference to FIGS. 7 and 8.

Figure 7:
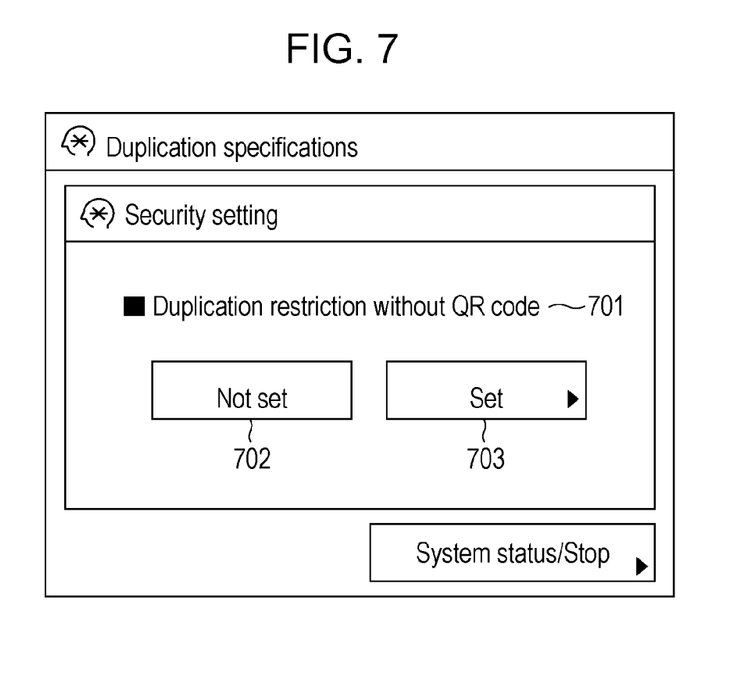
FIG. 7 illustrates an operation user interference (security setting) of an information processing apparatus.

FIG. 7 illustrates an exemplary setting user interface used for realizing the first or second exemplary embodiment. With the setting user interface in FIG. 7, the user is capable of selecting a security setting. If the user selects "Set" 703 when "Duplication restriction without QR code" 701 is displayed, the accepting unit 303 accepts the selection by the user and the CPU 300 sets the security setting of the MFP 100 to the "Duplication restriction without QR code." When the accepting unit 303 accepts the selection of the Copy start button by the user, the flowchart according to the first or second exemplary embodiment is started. If the user selects "Not set" 702, the MFP 100 operates in a state where the "Duplication restriction without QR code" is not set as the security setting. In the state where the "Duplication restriction without QR code" is not set as the security setting, the duplication is permitted regardless of the presence of the QR code 2001 and the QR code 2003 on the document 1001 and the document 1003 to be duplicated, respectively.

Figure 8:
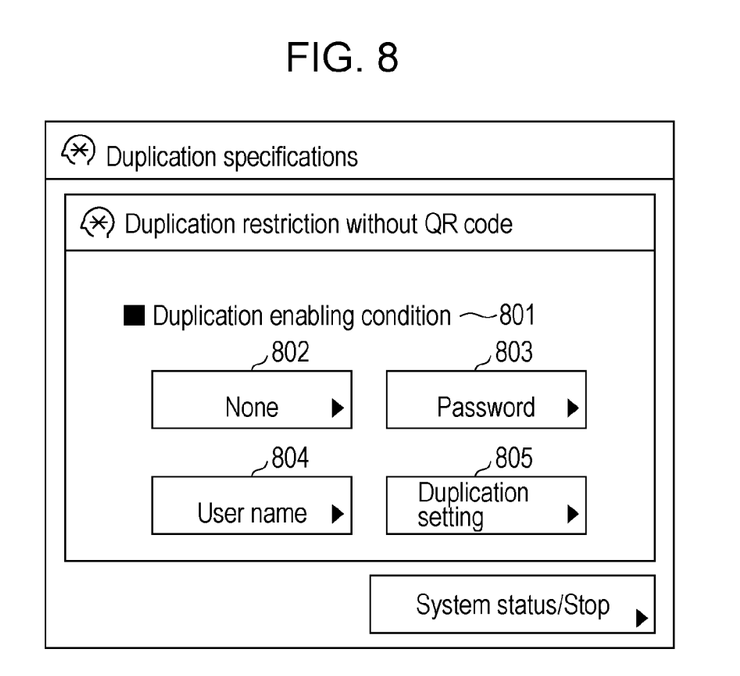
FIG. 8 illustrates an operation user interface (duplicate enabling condition setting) of an information processing apparatus.

FIG. 8 illustrates an exemplary setting user interface in which "Duplicate enabling condition" 801 is accepted as the detailed setting when the CPU 300 sets the security setting to the "Duplication restriction without QR code" in the second exemplary embodiment. The "Duplicate enabling condition" 801 is a condition enabling the duplication even if the CPU 300 determines that the QR code 2003 does not exist in the document 1003 to be duplicated. "None" 802, "Password" 803, "User name" 804, or "Duplication setting" 805 is set as the "Duplicate enabling condition" 801. When the user selects the duplicate enabling condition, the accepting unit 303 accepts the selection by the user. The CPU 300 sets the duplication enabling condition based on the accepted selection.

When "None" 802 is set as the duplicate enabling condition, the duplication of the document 1003 is not permitted if the QR code 2003 does not exist in the document 1003. The flowchart of the process is described in the second exemplary embodiment.

When the "Password" 803 is set as the duplicate enabling condition, the CPU 300 causes the accepting unit 303 to accept input of the password from the user if the QR code 2003 does not exist in the document 1003. If the password accepted by the accepting unit 303 coincides with the password set in the user interface in FIG. 8 in advance, if the duplicate enabling condition is satisfied, the CPU 300 determines the permission of duplication.

When the "User name" 804 is set as the duplicate enabling condition, the CPU 300 causes the accepting unit 303 to accept input of the user name from the user if the QR code 2003 does not exist in the document 1003. If the user name accepted by the accepting unit 303 coincides with the user name set in the user interface in FIG. 8 in advance, if the duplicate enabling condition is satisfied, the CPU 300 determines the permission of duplication. The CPU 300 may determine the non-permission of duplication if the user name set in advance coincides with the user name accepted by the accepting unit 303.

If the QR code 2003 does not exist in the document 1003 when the "Duplication setting" 805 is set as the duplicate enabling condition, the CPU 300 determines the permission of duplication if the setting set in the user interface in FIG. 8 in advance coincides with the duplication setting set for the document 1003, if the duplicate enabling condition is satisfied. The duplication setting is, for example, a monochrome setting, an N-up setting, a duplex setting, or a sheet size setting.

Setting the duplicate enabling condition for the document on which the QR code 2003 is not added and for which the duplication is not permitted allows more flexible security to be achieved.

Setting the "Duplication setting" 805 as the duplicate enabling condition can prevent unauthorized use of a duplicated document. Specifically, in a case of a document, such as a resident card, that is valid only when the document is printed in a specific duplication setting, permitting the duplication only in the duplication settings other than the specific duplication setting can prevent unauthorized use of the duplicated document.

Access control may be performed in which, for example, the selection with the setting user interfaces shown in FIGS. 7 and 8 by persons other than the administrator of the system is prohibited.

Other Embodiments

The duplication in the above exemplary embodiments means that a certain object is imitated to produce an object similar to the object. The duplication may be applied to transmission or storage in a storage medium in which an image is output as digital information, in addition to the copying in which a document image is output on a paper medium.

Although the QR code, which is a two-dimensional code, is used as an example of the partial code in the above exemplary embodiments, the partial code is not restricted to the QR code and the partial code may be any code, such as an ST code, a barcode, or a mark, as long as the partial code can be used to partially add digital information or analog information on a document. Although the LVBC, which is a two-dimensional code, is used as an example of the overall code, the overall code is not restricted to the LVBC and the overall code may be any code, such as a Glyph code or a copy-forgery-inhibited pattern, as long as the overall code can be used to add digital information or analog information over a document.

The overall code described above may be substituted for the QR code applied in the above exemplary embodiments. The case in which the overall code is used as a substitute for the QR code will now be described. The information included in the overall code and the content of the copy log 210, are described and a description of the other processing is omitted herein because the other processing is similar to that in the above exemplary embodiments.

The overall code used as a substitute for the QR code includes three kinds of information: "permission of duplication," "conditional permission of duplication," and "non-permission of duplication." The "permission of duplication" indicates that the duplication of a document including this information is permitted without any condition. The "conditional permission of duplication" includes "permission of duplication with a password condition" and "permission of duplication with a user authentication condition." The "permission of duplication with a password condition" indicates that the duplication of a document is permitted if the authentication by using a password succeeds. The "permission of duplication with a user authentication condition" indicates that the duplication of a document is permitted if the authentication by using user information succeeds. The "non-permission of duplication" indicates that the duplication of a document including this information is not permitted. If the "permission of duplication" or the "conditional permission of duplication" is included in the overall code, the CPU 300 determines in Step S205 in the flowchart in FIG. 4 that the duplication permission flag is detected. If the "non-permission of duplication" is included in the overall code, the CPU 300 determines in Step S205 in the flowchart in FIG. 4 that no duplication permission flag is detected.

The content of the copy log 210 when a document including the overall code described above is to be duplicated will now be described. The following processing is realized by the CPU 300 that executes the programs in the storage unit 200 to control each component in the MFP 100. If the information included in the overall code is stored as the copy log 210 in Step S210 in the flowchart in FIG. 4, the information is also stored. Specifically, if the information included in the overall code is the "permission of duplication," the "permission of duplication" is stored in the copy log 210 as the information. If the information included in the overall code is the "permission of duplication with a password condition," the "permission of duplication with a password condition" is stored in the copy log 210 as the information and information about the password is also stored in the copy log 210. If the information included in the overall code is the "permission of duplication with a user authentication condition," the "permission of duplication with a user authentication condition" is stored in the copy log 210 as the information and information indicating the user is also stored in the copy log 210. The information included in the overall code is stored in association with information about an image to be duplicated and information indicating the user who performs the duplication.

The storage in the copy log 210 in Step S210 is performed if the CPU 300 determines the permission of duplication. However, the information included in the overall code, the information about the image to be duplicated, and the information indicating the user who performs the duplication may be stored in association with each other if the CPU 300 determines the non-permission of duplication (NO in Step S208). The duplication is not permitted in the following cases. In a first case, the "non-permission of duplication" information is included in the overall code of the image to be duplicated. In a second case, the "conditional permission of duplication" information is included in the overall code of the image to be duplicated and the authentication by using a password or user information does not succeed. In a third case, the overall code does not exist in the image to be duplicated. In a fourth case, the CPU 300 detects in Step S403 that the hash value of the overall code is not properly included in the digital information on the overall code of another kind (the LVBC 3003).

Information included in the overall code that is stored in the copy log 210 in the above four cases will now be specifically described. In the first case, the "permission of duplication" is stored in the copy log 210 as the information included in the overall code. In the second case, the "permission of duplication with a password condition" or the "permission of duplication with a user authentication condition" is stored in the copy log 210 as the information included in the overall code and information about the password or information indicating the user is also stored in the copy log 210. In the third case, "none" is stored in the copy log 210 as the information included in the overall code because no overall code exists. Alternatively, information about the image and information indicating the user may be stored in the copy log 210 in association with each other and information included in the two-dimensional code may not be stored in the copy log 210. In the fourth case, the information included in the overall code is stored in accordance with the overall code and that at least one of information indicating the duplication is not permitted because of the mismatching of the hash values and the hash value is stored in the copy log 210.

The recording of the associated information in the non-permission of duplication allows the user who attempts unauthorized duplication to be identified and allows the image that is to be subjected to unauthorized duplication to be recognized.

Although the information included in the two-dimensional code is described above as an example of the information based on the two-dimensional code, the information included in the two-dimensional code is not restricted to the above one. For example, the information based on the two-dimensional code may be the result of determination by the CPU 300 of whether the duplication of an image to be duplicated is permitted based on the two-dimensional code included in the image to be duplicated. The information included in the two-dimensional code indicates digital information resulting from the decoding of the two-dimensional code. The duplication permission flag and the information indicating the "permission of duplication," the "non-permission of duplication," and "the conditional permission of duplication" correspond to the information included in the two-dimensional code in the above exemplary embodiments.

The storage unit 200, which is the storage medium in the above exemplary embodiments, may be any medium (for example, a hard disk drive (HDD) or a random access memory (RAM)) as long as digital information can be stored in the medium.

Although the MFP 100 capable of the readout of an image, the processing of digital information, and the printing of an image on a sheet of paper is described in the above exemplary embodiments, the readout of an image, the processing of digital information, and the printing of an image on a sheet of paper may be performed by separate units.

The present invention can be embodied by a computer that reads out a program realizing the steps in the flowcharts in the above exemplary embodiments from a storage medium and executes the readout program. The program read out from the storage medium realizes the functions according to the above exemplary embodiments. Accordingly, the present invention is applicable to the program and the storage medium including the program.

The storage medium supplying the program may be, for example, a flexible disk, a hard disk, an optical disk, a magneto-optical disk, a compact disk-read only memory (CD-ROM), a compact disc recordable (CD-R), a magnetic tape, a nonvolatile memory card, or a read only memory (ROM), from which the computer can read out data.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-115737 filed Apr. 25, 2008, which is hereby incorporated by reference herein in its entirety.

What is claimed is:
1. A printing apparatus comprising:
a detecting unit configured to detect whether there are a two-dimensional Quick Response (QR) code and a low visibility barcode (LVBC) in an original image;
a first determining unit configured to determine whether the detected low visibility barcode (LVBC) includes information corresponding to a hash value of the detected two-dimensional Quick Response (QR) code;
a second determining unit configured to determine whether the detected two-dimensional Quick Response (QR) code includes a copy permission; and
a printing unit configured to print the original image,
wherein the original image is not printed in a case where it is determined, by the second determination unit, that the detected low visibility barcode (LVBC) does not include information corresponding to the hash value of the detected two-dimensional Quick Response (QR) code and the detected two-dimensional Quick Response (QR) code is determined by the first determining unit to include the copy permission, and wherein the original image is printed in a case where it is determined, by the second determination unit, that the detected low visibility barcode (LVBC) includes information corresponding to the hash value of the detected two-dimensional Quick Response (QR) code and the detected two-dimensional Quick Response (QR) code is determined by the first determining unit to include the copy permission.

2. A method comprising:

detecting whether there are a two-dimensional Quick Response (QR) code and a low visibility barcode (LVBC) in an original image;

determining whether the detected low visibility barcode (LVBC) includes information corresponding to a hash value of the detected two-dimensional Quick Response (QR) code;

determining whether the detected two-dimensional Quick Response (QR) code include includes a copy permission; and wherein the original image is not printed in a case where it is determined that the detected low visibility barcode (LVBC) does not include information corresponding to the hash value of the detected two-dimensional Quick Response (QR) code and the detected two-dimensional Quick Response (QR) code is determined to include the copy permission, and wherein the original image is printed in a case where it is determined that the detected low visibility barcode (LVBC) includes information corresponding to the hash value of the detected two-dimensional Quick Response (QR) code and the detected two-dimensional Quick Response (QR) code is determined to include the copy permission.

3. A non-transitory storage medium which stores a program for causing a computer to execute the method according to claim 2.

* * * * *